United States Patent [19]

Healy, Jr.

[11] Patent Number: 4,523,296

[45] Date of Patent: Jun. 11, 1985

[54] REPLACEABLE INTERMEDIATE SOCKET AND PLUG CONNECTOR FOR A SOLID-STATE DATA TRANSFER SYSTEM

[75] Inventor: Jerry V. Healy, Jr., Raleigh, N.C.

[73] Assignee: Westinghouse Electric Corp., Pittsburgh, Pa.

[21] Appl. No.: 455,435

[22] Filed: Jan. 3, 1983

[51] Int. Cl.$^3$ .............................................. G01D 9/00
[52] U.S. Cl. .................................. 364/900; 339/166 R
[58] Field of Search ................... 364/200, 900, 483; 339/166, 145 D; 206/328

[56] References Cited

U.S. PATENT DOCUMENTS

| | | | |
|---|---|---|---|
| 3,229,240 | 1/1966 | Harrison et al. | 339/166 R |
| 3,688,244 | 8/1972 | Savoca et al. | 339/60 M |
| 4,368,519 | 1/1983 | Kennedy | 364/900 |

FOREIGN PATENT DOCUMENTS

| | | |
|---|---|---|
| 594006 | 3/1934 | Fed. Rep. of Germany . |
| L16476 | 3/1956 | Fed. Rep. of Germany . |
| 1011629 | 6/1952 | France . |
| 490013 | 8/1938 | United Kingdom . |

Primary Examiner—Eddie P. Chan
Assistant Examiner—Tim A. Wiens
Attorney, Agent, or Firm—William D. Lanyi

[57] ABSTRACT

A replaceable intermediate socket and plug connector for a solid state data transfer system characterized by recording means for receiving digital data from a source of a train of electrical pulses and for delivering a desired digital data format, a magnetic memory cartridge pluggable into the recording means for receiving the digital data format, reader means into which the cartridge is subsequently plugged for receiving digital data format and for transferring the format to a data storage device, and replaceable intermediate connector means disposed between the cartridge and the reader means, so that the connector means is replaceable from time to time for maintaining integrity of reliable data retrieval via the cartridge.

4 Claims, 4 Drawing Figures

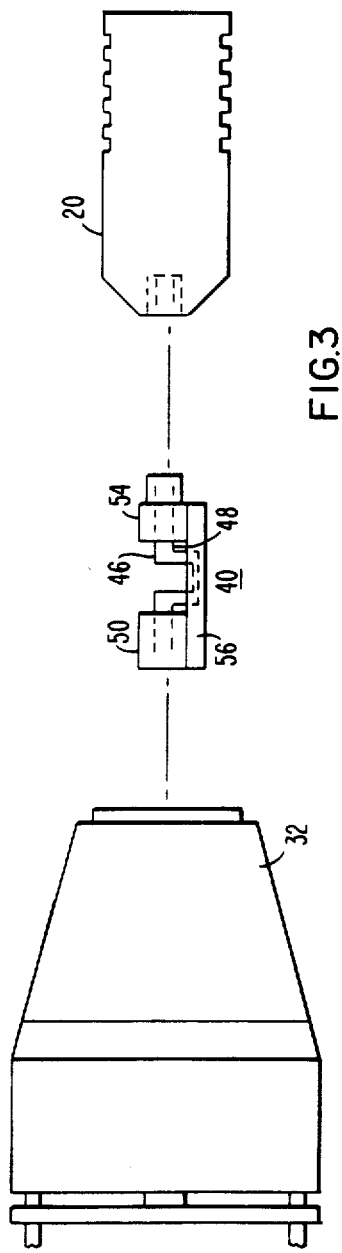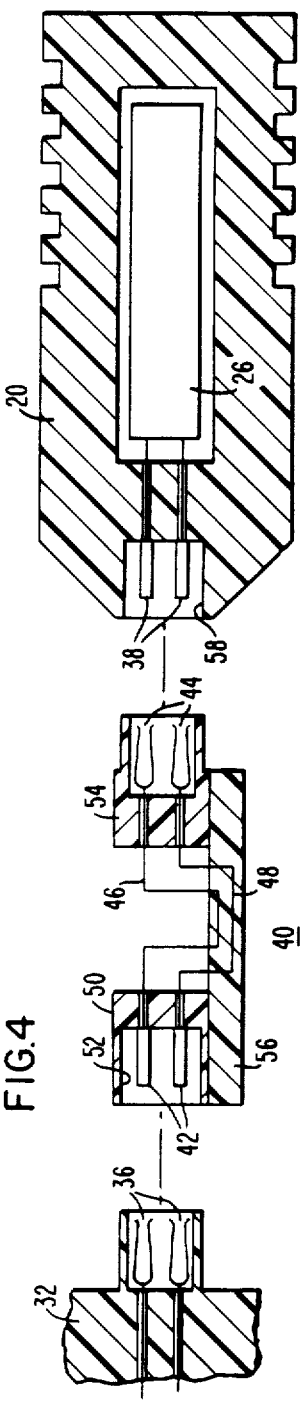

REPLACEABLE INTERMEDIATE SOCKET AND PLUG CONNECTOR FOR A SOLID-STATE DATA TRANSFER SYSTEM

BACKGROUND OF THE INVENTION

1. Field of the Invention

This invention relates to a disposable connector for a solid state data storage device and its associated reader so as to maintain the integrity of the data transfer between the device and an associated computer system.

2. Description of the Prior Art

Since the 1950's the utility industry has used magnetic tape systems to record interval-by-interval energy data for load surveys. Currently, magnetic tape is used extensively for load research, revenue billing, and system engineering applications. The tape is contained in a cartridge, which is typically removed from a recorder once a month, and transported to a central data processing center where the data is read from the tape via a tape reader in less than two minutes. This data is then stored in another memory media associated with a computer and ultimately manipulated to suit the needs of the particular utility.

An electrical power demand data recording system and its associated reader have been proposed which could replace the present magnetic tape cartridge with a cartridge containing non-volatile, solid-state memory. The solid-state memories proposed may be complementary metal oxide semiconductors (CMOS), random access memories (RAMs) with battery backup, eraseable programmable read-only memories (EPROMs), magnetic bubble memories, etc. The solid-state cartridge is applied in a manner similar to the tape cartridge, but it entails new operating constraints. As with the tape system, each solid state cartridge is retrieved at certain intervals and returned to a data processing center where the data is read from the cartridge and stored in another memory media such as a computer.

During that procedure, each central reader processes a large number of cartridges. The number of cartridges per month is directly proportional to the number of recorders in the field. In the case of the tape reader, playback head wear becomes a critical factor in the integrity of reliable data retrieval. On the other hand, interface connector wear becomes the critical factor in the integrity of reliable data retrieval through a solid-state memory reader.

SUMMARY OF THE INVENTION

In accordance with the present invention, it has been found that a replaceable intermediate socket and plug connector for a solid-state data transfer system may be provided which system comprises recording means for receiving digital data from a source of a train of electrical pulses and for converting the pulses into a desired digital data format; the recording means including a data controller by which the digital data format is converted into solid-state signals, and the data controller having terminal means including sockets for receiving corresponding mating plugs; reader means having mating sockets and including means for receiving the solid-state signals and for converting the signals into a digital data format suitable for transfer to a data storage device; the recorder means and the reader means each comprising logic circuitry means for converting between the pulses and the digital data format; a magnetic memory cartridge having mating terminal plugs for detachable connection with the sockets of the recording means and reader means and including solid-state memory means for receiving said signals from the data controller when the cartridge is connected to said controller; replaceable intermediate connector means disposed between the cartridge and the reader means which cartridge comprises two spaced terminal means including mating plugs engageable with the sockets of the reader means and including mating sockets for engagement with the terminal plug of the magnetic memory cartridge, and including conductor means extending between the corresponding terminal sockets and plugs of the connector means, whereby the intermediate connector means is replaceable from time to time when reduced electrical contact occurs between the plugs and sockets due to wear, fatigue, and/or corrosion.

The advantage of the device of this invention is that a cost effective means is achieved to eliminate a potential mechanical problem when dealing with solid-state data storage devices.

BRIEF DESCRIPTION OF THE DRAWINGS

FIG. 3 is an exploded view of a receiver/controller, an intermediate connector, and a magnetic memory cartridge;

FIG. 4 is a sectional view of the exploded parts as shown in FIG. 3.

DESCRIPTION OF THE PREFERRED EMBODIMENT

Figure 1:
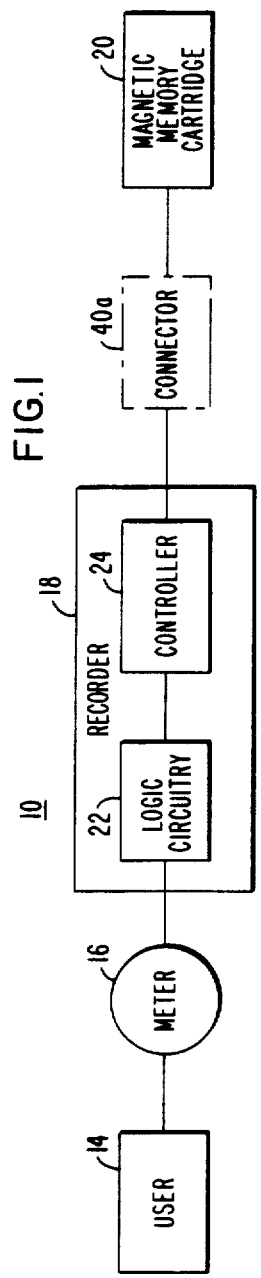
FIG. 1 is a schematic view of a means for recording energy consumption of a user.
Figure 2:
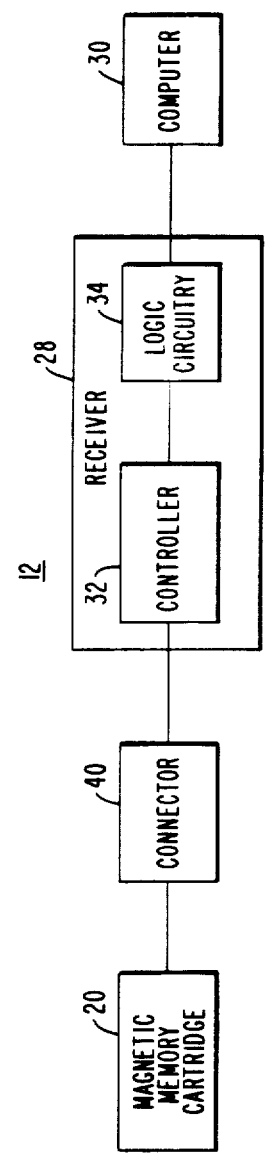
FIG. 2 is a schematic view of a means for receiving and storing the information of energy consumed by the user.

An electrical power demand data recording system is generally indicated at 10 in FIG. 1 and its associated reader is generally indicated at 12 (FIG. 2). The system 10 includes a user 14 of electrical power, a meter 16 for measuring the power used, a recorder 18 in conjunction with the meter, and a magnetic memory cartridge 20. The user 14 may be any consumer of electric power, including a private home or a commerical business establishment where electric power is ordinarily used, although only larger users such as factories or shopping centers generally are equipped with such recording systems. The amount of electric power consumed is measured by the watthour meter 16 which generates information on the energy usage of the user 14; such as reactive power, demand or total consumption in the form of a train of pulses. The pulses are converted into the desired digital data format by logic circuitry 22 in the recorder 10. This data is then converted by a controller 24 into signals compatible with the magnetic memory cartridge 20. For a more complete description and understanding of the particular meter 16 and recorder 18 reference is made to U.S. Pat. No. 3,943,498, wherein a magnetic tape data recorder is disclosed instead of a magnetic memory cartridge 20 as set forth in this invention. Suffice it to say, U.S. Pat. No. 3,943,498 discloses logic circuitry and controller means, such as the logic circuitry 22 and controller 24 used in this invention.

The magnetic memory cartridge 20 is more generally designated as a magnetic bubble cartridge and contains storage means 26 (FIG. 4) which comprises a substrate with loops of memory bubbles, whereby the solid-state signals generated by the controller 24 are received for storage in the cartridge 20.

Subsequently, the bubble cartridge 20 is removed from the system 10 and transferred to the reader 12 (FIG. 2) which comprises a receiver 28 and a solid-state data storage device such as a computer 30. The receiver 28 includes a controller 32 and logic circuitry 34. When the cartridge 20 is plugged into the receiver, the solid-state format stored in the storage means 26 is received by the controller 32 where the signals compatible with the cartridge are reconverted to the desired digital data format, which in turn are converted by the logic circuitry 34 into a train of pulses for transmittal to the computer 30.

In accordance with this invention, it has been found that a potential mechanical problem exists when dealing with the solid state data storage devices. Due to frequent connection, or plugging and unplugging, of the magnetic bubble cartridges 20, interface wear becomes a critical factor in the integrity of reliable data retrieval through the solid-state receiver 28. To a lesser extent the problem may exist between the cartridge 20 an the recorder 18. The terminal connections between the cartridge and the controller 24 as well as the controller 32 comprises mating plugs and sockets which wear proportionally as connection and disconnection increases. Ultimately, the integrity of the connection becomes questionable.

As shown in FIG. 4 the terminal portion of the controller 32 is provided with sockets 36 for mating connection with corresponding prongs, plugs, or blades 38. The controller 24 (FIG. 1) is likewise provided with sockets (not shown) similar to sockets 36 for connection with the prongs 38. The sockets 36 are spring-biased jaws or spring clip members having a reduced entrance cross-section for good electrical engagement with the prongs 38.

In accordance with this invention replaceable intermediate connector means or connector 40 (FIG. 4) is disposed between the bubble cartridge 20 and the controller 32 and is comprised of a plurality of prongs, plugs, or blades 42 and corresponding sockets 44 as well as conductors 46, 48 therebetween. The connector 40 also comprises a dielectric housing member 50 having a chamber 52 within which the prongs 42 are disposed. A second dielectric housing member 54 is also provided for supporting the sockets 44. Both members 50, 54 are fixedly mounted on a circuitboard 56 in which the conductors 46, 48 are mounted.

In operation, the connector 40 is detachably mounted on the controller 32 with the prongs 42 seated within the sockets 36. The bubble cartridge 20 is then plugged into engagement with the socket end of the connector 40 with the prongs 38 seated in the sockets 44 to enable transfer of data from the cartridge to the computer 30.

As shown in FIG. 4 the prongs 38 are preferably recessed within a chamber 58 in the cartridge 20.

When a cartridge 20 is mounted on controller 32, the information transferred to the computer 30 may be accomplished in a relatively short time period, such as two minutes. Thereafter another similar cartridge replaces the prior cartridge 20 and the process of retrieving information from a plurality of connectors continues. As a result, the sockets 44 are subjected to frequent plugging and unplugging activity, whereby interface connector wear becomes a critical factor in the integrity of reliable data retrieval. For that reason the connector is expendable and replaced from time to time.

It is understood that the controller 24 in the recorder (FIG. 1) is subjected to less frequent plugging and unplugging with the cartridge 20, the cartridge being plugged in for an extended period of time, such as a month. The cartridge 20 is then taken to the receiver 28 and subsequently returned to a recorder 18. For that reason the terminals of the controller 24 are subjected to less frequent wear and tear of plugging and unplugging. However, a connector 40a may be used in a similar manner between the controller 24 and a cartridge 20 if desirable.

As shown in FIG. 4, the bubble cartridge 20 is provided with prongs 38 and the controller 32 comprises the sockets 38. However, within the scope of this invention it is understood that the prongs 38 and sockets 36 may be interchanged without affecting the basic operation of the device of this invention. Such a reversal of prongs and socket would include similar interchange of sockets and prongs in the connector 40.

The connector 40 is mechanically mounted on the receiver/reader 32 by suitable means, such as screws, but is easily removed and replaced by a similar device at regular intervals or when the connector wears out. Finally, the use of a detachable connector eliminates the need for removing a connector and its associated expensive electronics to which it is otherwise attached and scrapping due to connector wearout. An operator can be assured that a positive mating connection between the cartridge and reader is obtained so as to maintain the integrity of the data transfer. The life of the connector in the reader can be extended to approximately its original life, based on the number of insertions and withdrawal cycles it was designed for, multiplied by itself.

What is claimed is:

1. A solid-state data transfer system, comprising:
a controller means for receiving a train of pulses, said train of pulses being convertible into a preselected digital data format, said controller means having a terminal portion with a first set of two female sockets, said first set of two female sockets being partially enclosed by a first chamber;
a cartridge having a solid-state memory device contained within, said cartridge having a first set of two prongs connected in electrical communication with said solid-state memory device, said first set of two prongs being partially enclosed by a second chamber, said second chamber extending beyond the distal ends of each of said two prongs of said first set of two prongs, said second chamber being shaped to receive said first chamber in sliding association, said first set of two prongs being shaped to be received in interference relation by said first set of two female sockets simultaneously with said first chamber being received by said second chamber; and
an intermediate connector having a socket member and a prong member, said socket member having a second set of two female sockets and a third chamber, said second set of two female sockets being partially enclosed by said third chamber, said third chamber being shaped to be received by said second chamber in sliding relation, said second set of two female sockets being shaped to receive said first set of two prongs in interference relation simultaneously with said third chamber being received by said second chamber, said prong member having a second set of two prongs and a fourth chamber, said second set of two prongs being partially enclosed by said fourth chamber, said fourth chamber extending beyond the distal ends of each of said two prongs of said second set of two prongs, said fourth chamber being shaped to receive said first chamber in sliding association, said second set of two prongs being shaped to be received in interface relation by said first set of two female sockets simultaneously with said first chamber being received by said fourth chamber, said socket member and said prong member being rigidly attached together, each one of said two female sockets of said second set of two female sockets being connected in electrical communication with a preselected one of said two prongs of said second set of two prongs.

2. The data transfer system of claim 1, wherein: said first and second set of two female sockets each comprise female sockets having flexible spring-biased jaws.

3. The data transfer system of claim 1, wherein: said first, second, third and fourth chambers are made of a dielectric material.

4. The data transfer system of claim 1, further comprising:
a circuit board connected between and in electrical communication with said second set of two female sockets and said second set of two prongs.

* * * * *